(12) United States Patent
Papasakellariou

(10) Patent No.: US 9,402,248 B2
(45) Date of Patent: Jul. 26, 2016

(54) METHOD FOR DETERMINING THE LOCATION OF CONTROL CHANNELS IN THE UPLINK OF COMMUNICATION SYSTEMS

(71) Applicant: TEXAS INSTRUMENTS INCORPORATED, Dallas, TX (US)

(72) Inventor: Aris Papasakellariou, Houston, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 205 days.

(21) Appl. No.: 14/157,023

(22) Filed: Jan. 16, 2014

(65) Prior Publication Data
US 2014/0133437 A1 May 15, 2014

Related U.S. Application Data

(63) Continuation of application No. 11/554,679, filed on Oct. 31, 2006, now Pat. No. 8,649,362.

(60) Provisional application No. 60/732,868, filed on Nov. 2, 2005, provisional application No. 60/746,450, filed on May 4, 2006, provisional application No. 60/805,148, filed on Jun. 19, 2006.

(51) Int. Cl.
*H04W 72/04* (2009.01)
*H04L 1/18* (2006.01)
*H04L 5/00* (2006.01)

(52) U.S. Cl.
CPC ......... *H04W 72/0413* (2013.01); *H04L 1/1854* (2013.01); *H04L 5/0053* (2013.01); *H04L 5/0055* (2013.01); *H04L 5/0057* (2013.01); *H04L 5/0091* (2013.01); *H04L 5/0007* (2013.01); *H04L 5/0064* (2013.01); *H04W 72/042* (2013.01)

(58) Field of Classification Search
CPC ........... H04W 72/0413; H04W 72/042; H04L 5/0057; H04L 5/0055; H04L 5/0053; H04L 1/1854; H04L 5/0091; H04L 5/0007; H04L 5/0064
See application file for complete search history.

(56) References Cited

U.S. PATENT DOCUMENTS

| | | | |
|---|---|---|---|
| 7,414,989 B2 | 8/2008 | Kuchibhotla et al. | |
| 2005/0068884 A1* | 3/2005 | Yoon | H04L 5/0007 370/203 |
| 2005/0107036 A1 | 5/2005 | Song et al. | |
| 2005/0117536 A1 | 6/2005 | Cho et al. | |
| 2005/0141421 A1 | 6/2005 | Ishii et al. | |
| 2005/0281219 A1 | 12/2005 | Kim et al. | |
| 2006/0013245 A1 | 1/2006 | Abedi | |
| 2007/0047495 A1 | 3/2007 | Ji et al. | |
| 2007/0082620 A1 | 4/2007 | Zhang et al. | |
| 2007/0097927 A1* | 5/2007 | Gorokhov | H04B 1/7103 370/335 |

* cited by examiner

*Primary Examiner* — Paul H Masur
*Assistant Examiner* — Kabir Jahangir
(74) *Attorney, Agent, or Firm* — Ronald O. Neerings; Frank D. Cimino

(57) ABSTRACT

Embodiments of the invention provide methods for user equipments to implicitly determine the location for the transmission of uplink control signaling information, that is in response to downlink data packet transmissions, using information that is already available through the downlink control signaling for the respective downlink scheduling assignments. No additional explicit downlink control signaling is required for the transmission of the above uplink control signaling from each user equipment.

14 Claims, 7 Drawing Sheets

METHOD FOR DETERMINING THE LOCATION OF CONTROL CHANNELS IN THE UPLINK OF COMMUNICATION SYSTEMS

CROSS-REFERENCE TO RELATED APPLICATIONS

This application is a Continuation of application Ser. No. 11/554,679 filed Oct. 31, 2006, which claims priority to and incorporates by reference U.S. Provisional Application Nos. 60/732,868, filed Nov. 2, 2005; 60/746,450 filed May 4, 2006; and 60/805,148 filed Jun. 19, 2006.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to determining the location of control channels in the uplink of a communication system.

The global market for both voice and data communication services continues to grow as does use of the systems which deliver such services. As communication systems evolve, system design has become increasingly demanding in relation to equipment and performance requirements. Future generations of communication systems, will be required to provide high quality high transmission rate data services in addition to high quality voice services. Orthogonal Frequency Division Multiplexing (OFDM) is a technique that will allow for high speed voice and data communication services.

Orthogonal Frequency Division Multiplexing (OFDM) is based on the well-known technique of Frequency Division Multiplexing (FDM). OFDM technique relies on the orthogonality properties of the fast Fourier transform (FFT) and the inverse fast Fourier transform (IFFT) to eliminate interference between carriers. At the transmitter, the precise setting of the carrier frequencies is performed by the IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, up-converted to a radio frequency, amplified, and transmitted. At the receiver, the reverse process is performed. The received signal (input signal) is amplified, down converted to a band suitable for analog to digital conversion, digitized, and processed by a FFT to recover the carriers. The multiple carriers are then demodulated in multiple constellation decoders (one for each earner), recovering the original data. Since an IFFT is used to combine the carriers at the transmitter and a corresponding FFT is used to separate tire carriers at the receiver, the process has potentially zero inter-carrier interference such as when the sub-carriers are separated in frequency by an amount larger than the maximum expected Doppler shift.

FIG. 1 is a diagram illustrative of the Frequency 103—Time 101 Representation 100 of an OFDM Signal. In FDM different streams of information are mapped onto separate parallel frequency channels 140. Each FDM channel is separated from the others by a frequency guard band to reduce interference between adjacent channels.

The OFDM technique differs from traditional FDM in the following interrelated ways:
1. multiple carriers (called sub-carriers 150) carry the information stream;
2. the sub-carriers 150 are orthogonal to each other; and
3. a Cyclic Prefix (CP) 110 (also known as guard interval) is added to each symbol 120 to combat the channel delay spread and avoid OFDM inter-symbol interference (ISI).

The data/in formation carried by each sub-carrier 150 may be user data of many forms, including text, voice, video, and tire like. In addition, the data includes control data, a particular type of which is discussed below. As a result of the orthogonality, ideally each receiving element, tuned to a given sub-carrier does not perceive any of the signals communicated at any other of the sub-carriers. Given this aspect, various benefits arise. For example, OFDM is able to use orthogonal sub-carriers and, as a result, thorough use is made of the overall OFDM spectrum. As another example, in many wireless systems, the same transmitted signal arrives at the receiver at different times having traveled different lengths due to reflections in the channel between the transmitter and receiver. Each different arrival of the same originally-transmitted signal is typically referred to as a multi-path. Typically, multi-paths interfere with, one another, which is sometimes referred to as InterSymbol Interference (ISI) because each path includes transmitted data referred to as symbols. Nonetheless, the orthogonality implemented by OFDM with a CP considerably reduces or eliminates ISI and, as a result, a less complex receiver structure, such as one without an equalizer (one-tap "equalizer" is used), may be implemented in an OFDM system.

The Cyclic Prefix (CP) (also referred to as guard interval) is added to each symbol to combat the channel delay spread and avoid ISI. FIG. 2 is a diagram illustrative of using CP to eliminate ISI and perform frequency domain equalization. Blocks 200 each comprising cyclic prefix (CP) 210 coupled to data symbols 220 to perform frequency domain equalization. OFDM typically allows the application of simple, 1-tap, frequency domain equalization (FOE) through the use of a CP 210 at every FFT processing block 200 to suppress multi-path interference. Two blocks are shown for drawing convenience. CP 210 eliminates inter-data-block interference and multi-access interference using Frequency Division Multiple Access (FDMA).

Since orthogonality is typically guaranteed between overlapping sub-carriers and between consecutive OFDM symbols in the presence of time/frequency dispersive channels, the data symbol density in the time-frequency plane can be maximized and high data rates can be very efficiently achieved for high Signal-to-Interference and Noise Ratios (SINR).

FIG. 3 is a diagram illustrative of CP Insertion. A number of samples are typically inserted between useful OFDM symbols 320 (guard interval) to combat OFDM ISI induced by channel dispersion, assist receiver synchronization, and aid spectral shaping. The guard interval 310 is typically a prefix that is inserted 350 at the beginning of the useful OFDM symbol (OFDM symbol without the CP) 320. The CP duration 315 should be sufficient to cover most of the delay-spread energy of a radio channel impulse response. It should also be as small as possible since it represents overhead and reduces OFDM efficiency. Prefix 310 is generated using a last block of samples 340 from the useful OFDM symbol 330 and is therefore a cyclic extension to the OFDM symbol (cyclic prefix).

When the channel delay spread exceeds the CP duration 315, the energy contained in the ISI should be much smaller than the useful OFDM symbol, energy and therefore, the OFDM symbol duration 325 should be much larger than the channel delay spread. However, the OFDM symbol duration 325 should be smaller than the minimum channel coherence time in order to maintain the OFDM ability to combat fast temporal fading. Otherwise, the channel may not always be constant over the OFDM symbol and this may result in inter-sub-carrier orthogonality loss in fast fading channels. Since the channel coherence time is inversely proportional to the maximum Doppler shift (time-frequency duality), this implies that the symbol duration should be much smaller than the inverse of the maximum Doppler shift.

The large number of OFDM sub-carriers makes the bandwidth of individual, sub-carriers small relative to the total signal bandwidth. With an adequate number of sub-carriers, the Inter-carrier spacing is much narrower than the channel coherence bandwidth. Since the channel coherence bandwidth is inversely proportional to the channel delay spread, the sub-carrier separation is generally designed to be much smaller that the inverse of the channel coherence time. Then, the fading on each sub-carrier appears flat in frequency and this enables 1-tap frequency equalization, use of high order modulation, and effective utilization of multiple transmitter and receiver antenna techniques such as Multiple Input/Multiple Output (MIMO). Therefore, OFDM effectively converts a frequency-selective channel into a parallel collection of frequency flat sub-channels and enables a very simple receiver. Moreover, in order to combat Doppler effects, the inter-carrier spacing should be much larger than the maximum Doppler shift.

FIG. 4 shows the concepts of frequency diversity 400 and multi-user diversity 405. Using link adaptation techniques based on the estimated dynamic channel properties, the OFDM transmitter can adapt, the transmitted signal to each User Equipment (UE) to match channel conditions and approach the ideal capacity of frequency-selective channel. Thanks to such properties as flattened channel per sub-carrier, high-order modulation, orthogonal sub-carriers, and MIMO, it is possible to improve spectrum utilization and increase achievable peak data rate in OFDM system. Also, OFDM can provide scalability for various channel bandwidths (i.e. 1.25, 2.5, 5, 10, 20 MHz) without significantly increasing complexity.

OFDM may be combined with Frequency Division Multiple Access (FDMA) in an Orthogonal Frequency Division Multiple Access (OFDMA) system to allow multiplexing of multiple UEs over the available bandwidth. Because OFDMA assigns UEs to isolated frequency sub-carriers, intra-cell interference may be avoided and high data rate may be achieved. The base station (or Node B) scheduler assigns physical channels based on Channel Quality Indication (CQI) feedback information from the UEs, thus effectively controlling the multiple-access mechanism in the cell. For example, in FIG. 4, transmission to each of the three UEs 401, 402, 403 is scheduled at frequency sub-bands where the channel frequency response allows for higher SINR relative to other sub-bands. This is represented by the Received signal levels R401, R402, and R403 for users 401, 402 and 403 at Frequencies F401, F402, and F403 respectively.

OFDM can use frequency-dependent scheduling with optimal per sub-band Modulation & Coding Scheme (MCS) selection. For each UE and each Transmission. Time Interval (TTI), the Node B scheduler selects for transmission with the appropriate MCS a group of the active UEs in the cell according to some criteria that typically incorporate the achievable SINR per sub-band based on the CQI feedback. A UE may be assigned the same sub-hand for transmission or reception of its data signal during the entire TTI. In addition, sub-carriers or group of sub-carriers may be reserved to transmit pilot, control signaling or other channels. Multiplexing may also be performed in the time dimension, as long as it occurs at the OFDM symbol rate or at a multiple, of the symbol rate (i.e. from one TTI to the next). Tire MCS used for each sub-carrier or group of sub-carriers can also be changed at the corresponding rate, keeping the computational simplicity of the FFT-based implementation. This allows 2-dimensional time-frequency multiplexing, as shown in FIG. 5 and FIG. 6.

Turning bow to FIG. 5, which is a diagram illustrative of a configuration for multi-user diversity. The minimum frequency sub-hand used for frequency-dependent scheduling of a UE typically comprises several sub-carriers and may be referred to as a Resource Block (RB) 520. Reference number 520 is only pointing to one of the 8 RBs per OFDM symbol shown as example and for drawing clarity. RB 520 is shown with RB bandwidth 525 (typically comprising of a predetermined number of sub-carriers) in frequency dimension and time duration 510 (typically comprising of a predetermined number of OFDM symbols such as one TTI) in time dimension. Each RB may be comprised of continuous sub-carriers and thus be localized in nature to afford frequency-dependent scheduling (localized scheduling). A high data rate UE may use several RBs within same TTI 530, UE #1 is shown as an example of a high rate UE. Low data rate UEs requiring few time-frequency resources may be multiplexed within the same RB 540 or, alternatively, the RB size may be selected to be small enough to accommodate the lowest expected data rate.

Alternatively referring to FIG. 6, which is a diagram illustrative of a configuration for frequency diversity, an RB 620 may correspond to a number of sub-carriers substantially occupying the entire bandwidth thereby offering frequency diversity (distributed scheduling). This may be useful in situations where CQI feedback per RB is not available or it is unreliable (as is the case for high speed UEs) and only CQI over the entire frequency band is meaningful. Therefore, a sub-band (or RB) consists of a set of sub-carriers that may be either consecutive or dispersed over the entire spectrum. It should be noted, that another option to achieve frequency diversity is to assign to a UE two or more RBs with each RB comprising of contiguous sub-carriers but and with each RB occupying non-contiguous parts of the bandwidth. In such cases, an RB always consists of a contiguous set of sub-carriers (for both localized and distributed scheduling).

By assigning transmission to various simultaneously scheduled UEs in different RBs, the Node B scheduler can provide intra-cell orthogonality among the various transmitted signals. Moreover, for each individual signal, the presence of the cyclic prefix provides protection from multipath propagation and maintains in this manner the signal orthogonality.

Each scheduled UE is informed of its scheduling assignment by the serving Node B through the downlink (DL) control channel. This control channel typically carries the scheduled UE identities (IDs), RB assignment information, the MCS used to transmit the data, the transport block size, and hybrid ARQ (HARQ) information relating to possible data packet re-transmissions in case of a previous erroneous reception for the same date packet. The control channel may also optionally carry additional information such as for the support of a multi-input multi-output (MIMO) scheme for transmission mid reception with multiple antennas. A scheduling assignment may relate either to data transmission from the Node B to a UE (DL of a communication system) or to data transmission from a UE to the Node B (UL of a communication system).

In response to a DL data packet transmission, a UE needs to transmit a positive (ACK) or negative (NAK) acknowledgement to the Node B respectively indicating the correct or incorrect reception of the data packet. As UEs experience different SINR, conditions, the resource requirements for the ACK/NAK transmission to meet a target error rate can vary. For example, a UE in good SINR conditions may require only one resource unit for the ACK/NAK transmission while a UE in poor SINR conditions may require multiple resource units for the ACK/NAK transmission.

Although each UE may independently estimate its resource unit requirements, the location of the ACK/NAK transmission should be go-ordinated among simultaneously scheduled UEs in order to avoid collisions which may occur when multiple such. UEs attempt to use the same resource unit for ACK/NAK transmission. Explicitly co-ordinating such transmissions through DL control signalling is undesirable due to the increased associated overhead. Instead, it would be preferable if the DL information already transmitted for scheduling assignments is used to determine the location for the ACK/NAK UL transmission from each corresponding UE.

The UL resource unit can be a RB during one UL transmission instance or a cyclic shift of a CAZAC sequence, as described in U.S. application Ser. No. 11/461,982, which is transmitted in one or more RBs.

The requirement to co-ordinate ACK/NAK transmissions from multiple UEs having different requirements for the number of resource units can extent to the CQI transmissions from UEs in order to provide the serving Node B with an estimate of the channel, conditions experienced by DL transmissions.

Thus, there is a need for a method to provide co-ordination of UL control signalling related to DL scheduling and data packet transmissions that avoids explicit DL control signalling in order to avoid the corresponding overhead and in return increase the DL system throughput.

SUMMARY

Embodiments of the invention provide methods for user equipments (UEs) to independently determine the signaling locations of uplink (UL) control information related to downlink (DL) data packet transmissions from a serving Node B. This UL control information includes positive (ACK) or negative (NAK) acknowledgements related to previous DL packet transmissions. It may also include the feedback of a channel quality indicator (CQI) from UEs to the serving base station (Node B) in order for the latter to schedule subsequent data and control transmissions to the former. The proposed methods explicitly utilize a transmission method for the control channel and the two are jointly described.

Based on explicit or implicit CQI feedback from UEs and the estimated path loss, a serving Node B transmits the control channel to a scheduled UE using a modulation and coding scheme (MCS) determined from the CQI feedback for said UEs. This CQI feedback may be explicit, for the communication in the DL channel or implicit through the transmission of a reference signal for the communication in the UL channel. The spectral efficiency of the corresponding control channel transmission is optimized by having the Node B select the appropriate MCS based on the CQI estimate from scheduled UEs.

As the number of DL and UL scheduled UEs may vary during consecutive transmission time intervals (TTIs) and the corresponding control channels may be transmitted with different MCS, the size of the total control channel may also vary. The Node B communicates the number of DL and UL scheduling assignments in each MCS region, belonging to a predetermined set of MCS regions, through a field that is separately transmitted prior to the remaining part of the control channel carrying the DL and UL scheduling assignments. This field has a fixed and predetermined size and MCS and should be received at least by all DL and UL scheduled UEs and potentially by all UEs communicating with the reference serving Node B regardless if they receive a scheduling assignment during the reference TTI. Then, each UE can know of the size of the control channel and, for a pre-determined form of transmission, of the codewords in the various MCS regions (for example, control channel codewords in the lowest MCS region are transmitted first in predetermined time-frequency resources, followed by the codewords in the second lowest MCS region, and so on) the UE can know of the MCS region where its control channel codeword is transmitted.

Each DL scheduled UE can utilize the knowledge of the MCS regions used for the control channel transmission to all DL scheduled UEs during a corresponding TFT in order to transmit the associated control information in the UL, such as ACK/NAK regarding tire DL data packet reception and CQI feedback. The number and position of UL time-frequency resources assigned to the transmission of such UL control information can be directly related to the aforementioned knowledge and therefore no explicit DL control signaling and corresponding overhead is required.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with, the accompanying drawings and detailed description, wherein like reference numerals represent like parts.

DETAILED DESCRIPTION

Figure 1:
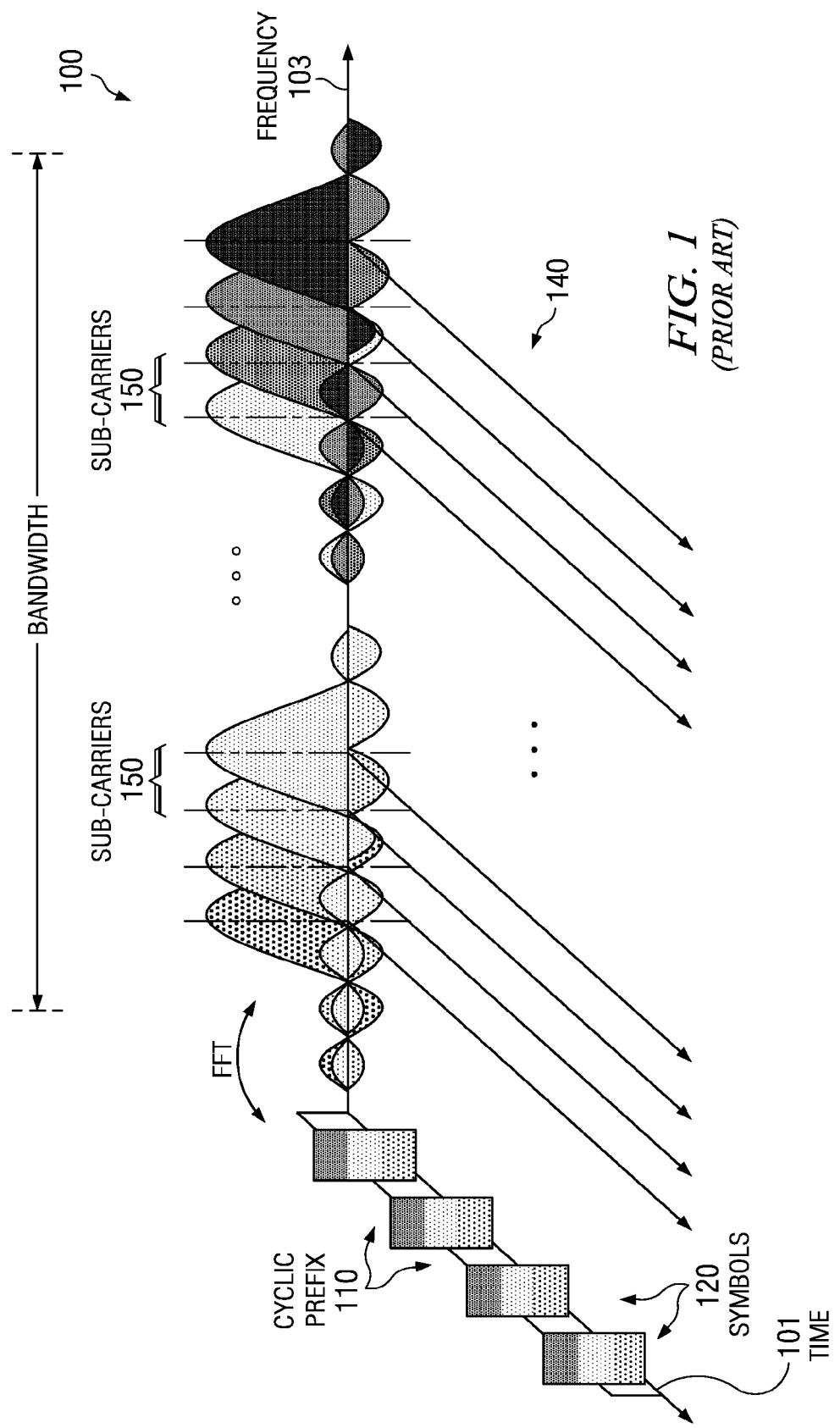
FIG. 1 is a diagram illustrative of the Frequency-Time Representation of an OFDM Signal.
Figure 2:
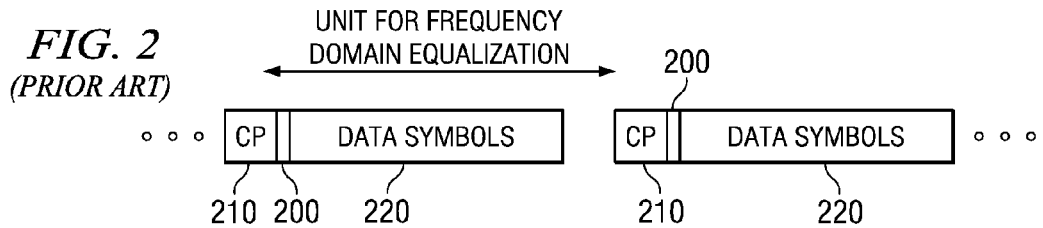
FIG. 2 is a diagram illustrative of using cyclic prefix (CP) to eliminate ISI and perform frequency domain equalization.
Figure 3:
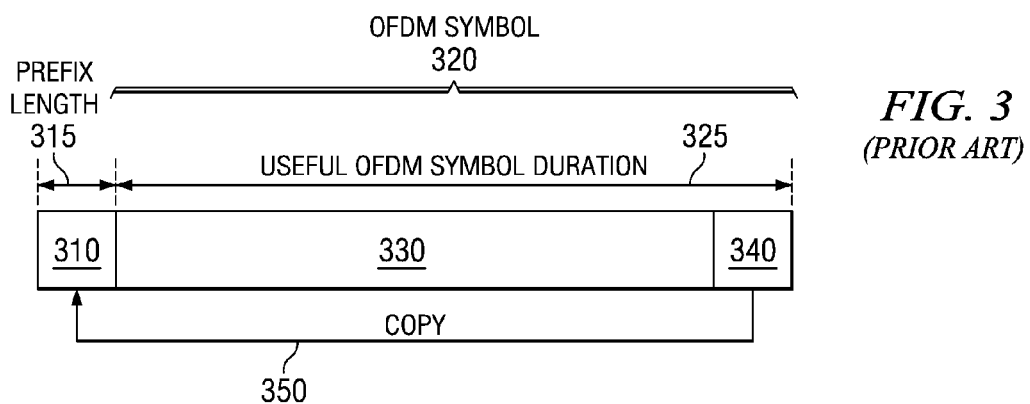
FIG. 3 is a diagram illustrative of Cyclic Prefix (CP) insertion
Figure 4:
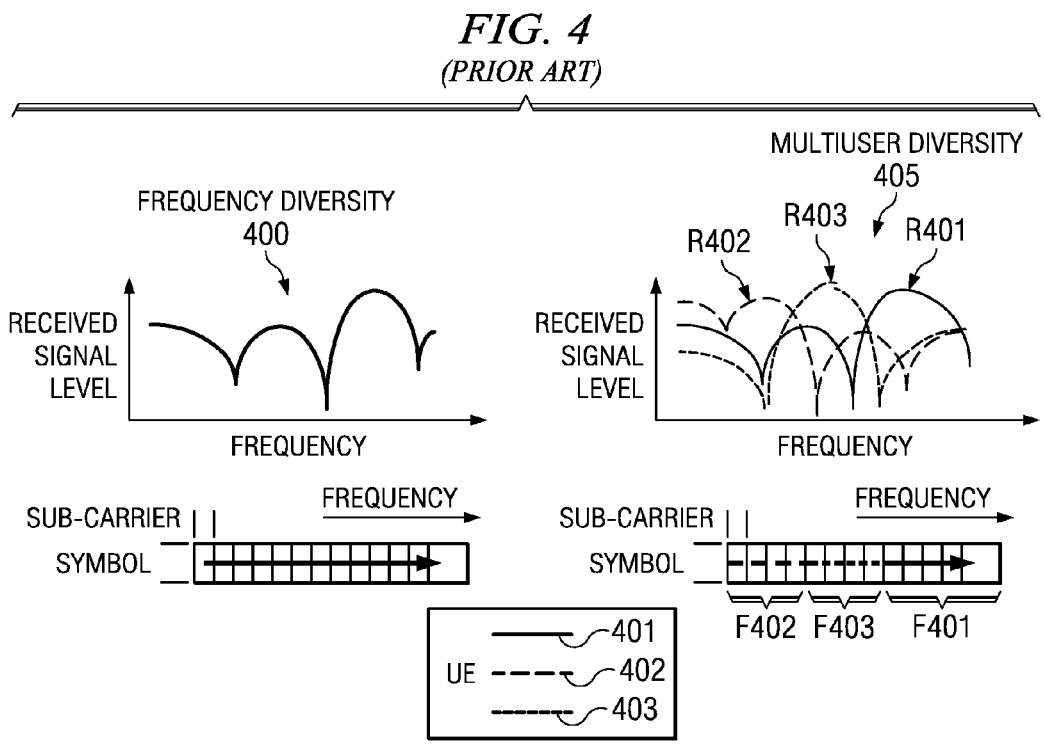
FIG. 4 shows the concepts of frequency and multi-user diversity.
Figure 5:
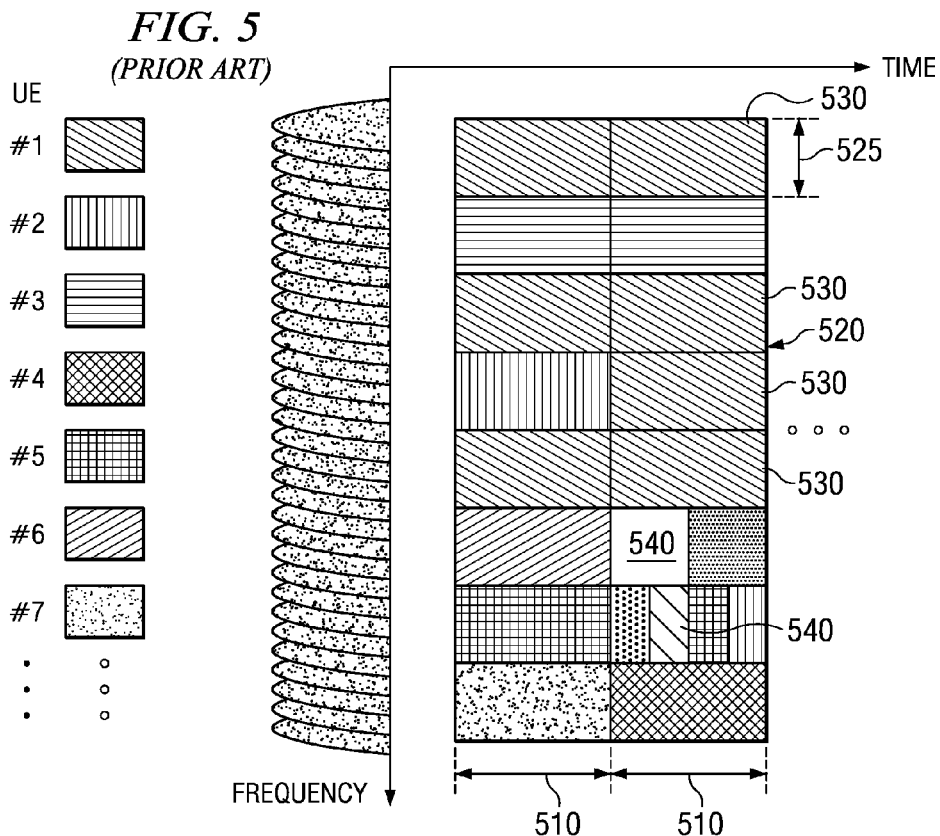
FIG. 5 is a diagram illustrative of a configuration for Multi-User Diversity.
Figure 6:
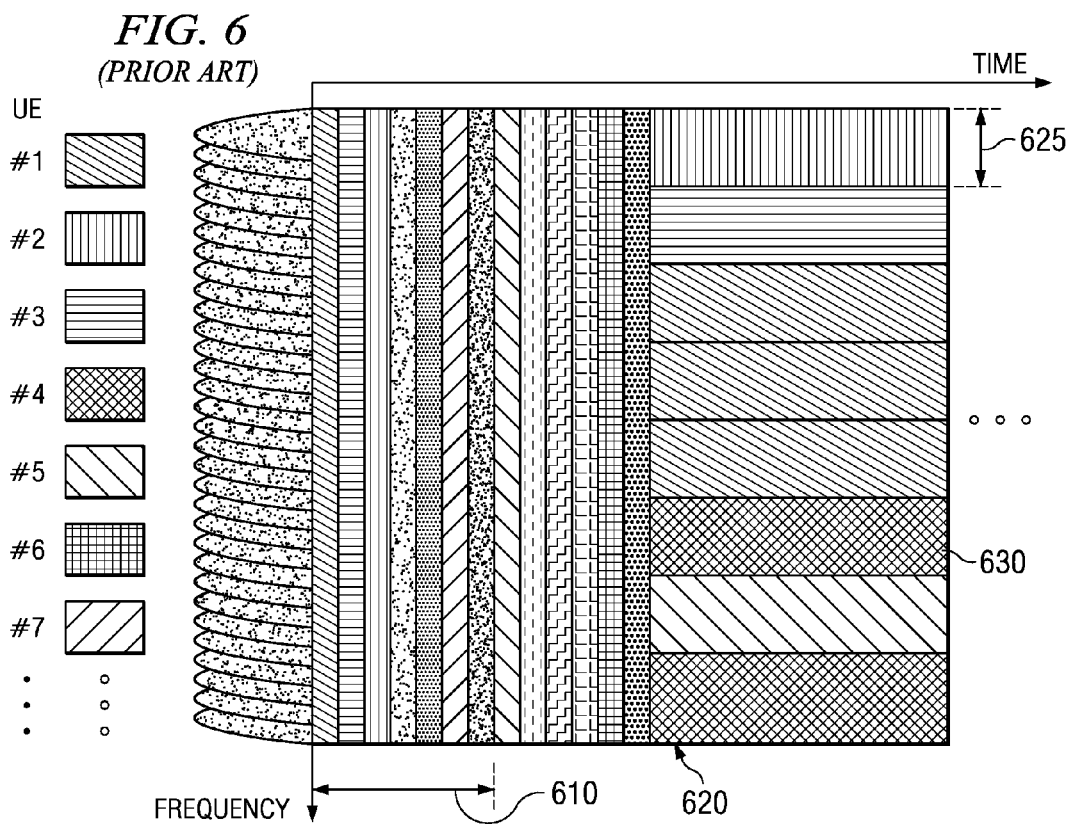
FIG. 6 is a diagram illustrative of a configuration for frequency diversity.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the invention address the problem for user equipments (UEs) to determine the location of uplink (UL) control information transmission in response to downlink (DL) data packet transmission, without explicit DL control signaling, in OFDMA-based networks, including variants of the OFDMA transmission method such as the single-carrier FDMA (SC-FDMA) transmission method. The UL control information transmission involves the transmission of positive or negative acknowledgements (respectively ACK or NAK) to DL transmitted data packets and of the channel quality indicator (CQI) associated with DL scheduling. The DL of a communication system refers to the communication from a serving base station (also commonly referred to as Node B) to one or more UEs and the UL refers to the communication from one or more UEs to a serving Node B. The control channel is transmitted in the DL (from the Node B to the scheduled UEs).

In the following, a field indicating the size of the DL control channel (also referred to as shared control channel or SCCH) and the number of DL and UL scheduled UEs is referred to as SCCH Category 0 (or Cat0). This field does not carry any information relating to DL or UL scheduling assignments. Rather, its purpose is to dimension the control channel so that UEs know how to decode the remaining SCCH that carries the scheduling related information. Cat0 will be demonstrated to provide the necessary information for the UEs to implicitly determine the location of die resources required for UL transmission of control information (ACK/NAK and CQI) related to DL data packet transmissions.

The SCCH pan carrying the scheduled UE identities (IDs) and allocated resource block (RB) position for each scheduled UE is referred to SCCH Category 1 (or Cat1). The remaining SCCH part is referred to as Category 2 (or Cat2). Cat2 carries information related to the modulation and coding scheme (MCS) applied to the data transmission, the transport formal, hybrid ARQ (HARQ) information relating to possible data packet retransmissions and possibly additional information such as for the multi-input multi-output (MIMO) scheme applied to data transmission.

This invention considers an SCCH structure involving Cat0 and the remaining SCCH (carrying scheduling assignment information). For the DL scheduling assignments (or scheduling grants), Cat2 may be transmitted either separately to Cat1 in RBs assigned to DL data transmission or together with Cat1 (in a single codeword as known in prior art). Clearly, only joint transmission of Cat1 and Cat2 is possible for UL scheduling assignments as there are no corresponding RBs in which data transmission follows in the DL (unless a UE has simultaneous DL and UL scheduling assignments). For ease of reference, the remaining SCCH (other than Cat0), will be referred to as Cat1, particularly in some Figures. It is not relevant to the invention whether Cat2 for DL assignments, as described in the previous paragraph, is transmitted together or separately to Cat1.

Figure 8:
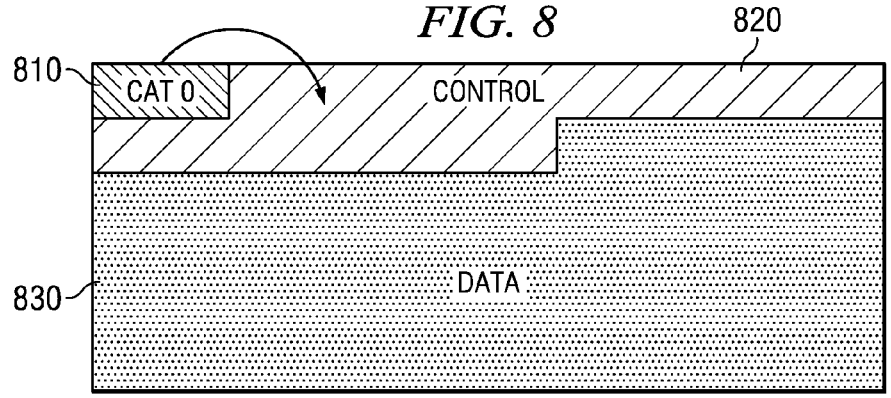
FIG. 8 shows an exemplary partitioning of the downlink transmission time interval (TTI) illustrating the transmission of the control channel Category 0, the remaining control channel, and the data channel.

FIG. 8 shows an exemplary partition for Cat0 810 and the remaining SCCH 820. As it was previously mentioned, Cat0 has a predetermined size and transmitted with an MCS that is known to all UEs. It specifies the size of the remaining SCCH. It is not necessary that Cat0 is transmitted in contiguous sub-carriers before the remaining SCCH and in practice the sub-carriers carrying the two may be multiplexed to provide frequency diversity. The remaining time-frequency resources can be assumed to be allocated to data 830, or other channels such as the reference signal channel, the synchronization channel, and die broadcast channel.

Figure 9:
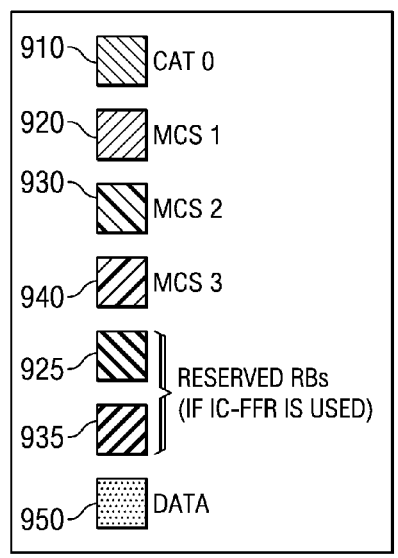
FIG. 9 shows an exemplary transmission of the control channel Category 0, and of the remaining control channel in various modulation and coding scheme (MCS) regions. Time division multiplexing (TDM) is assumed between the control and data channels.
Figure 9:
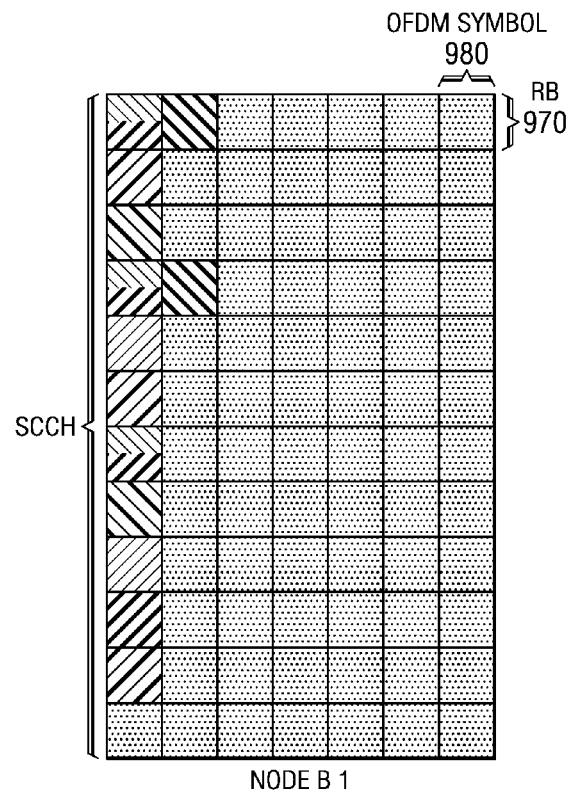
Figure 9:
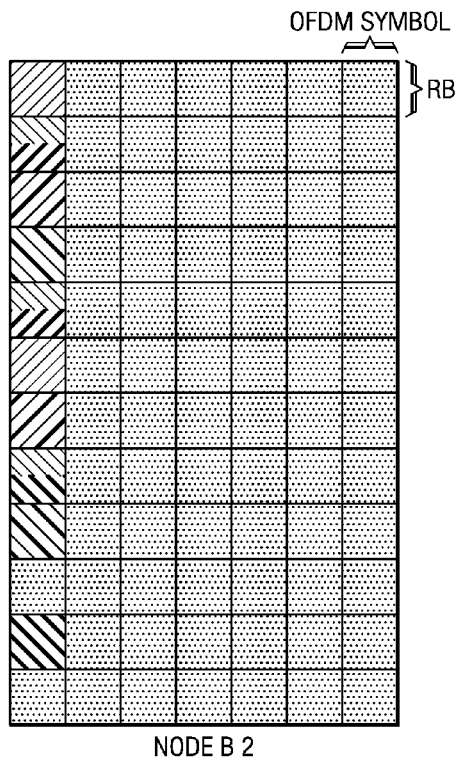
Figure 9:
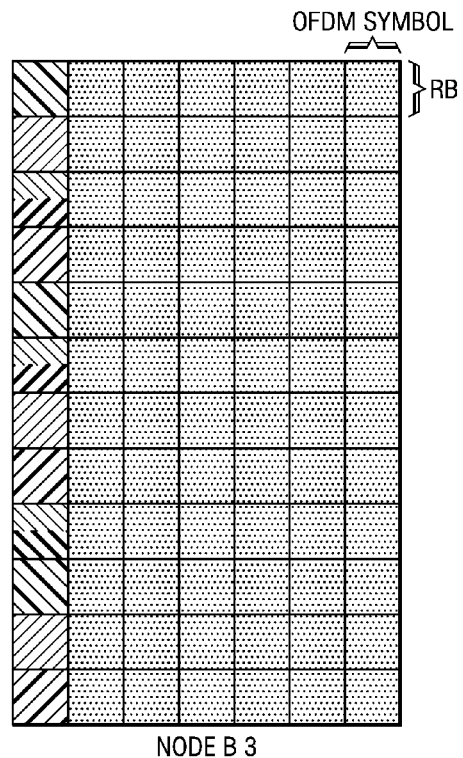
Figure 10:
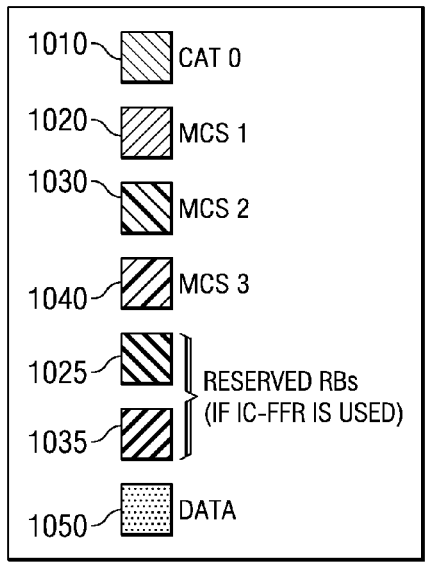
FIG. 10 shows an exemplary transmission of the control channel Category 0, and of the remaining control channel in various modulation and coding scheme (MCS) regions, frequency division multiplexing (FDM) is assumed between the control and data channels.
Figure 10:
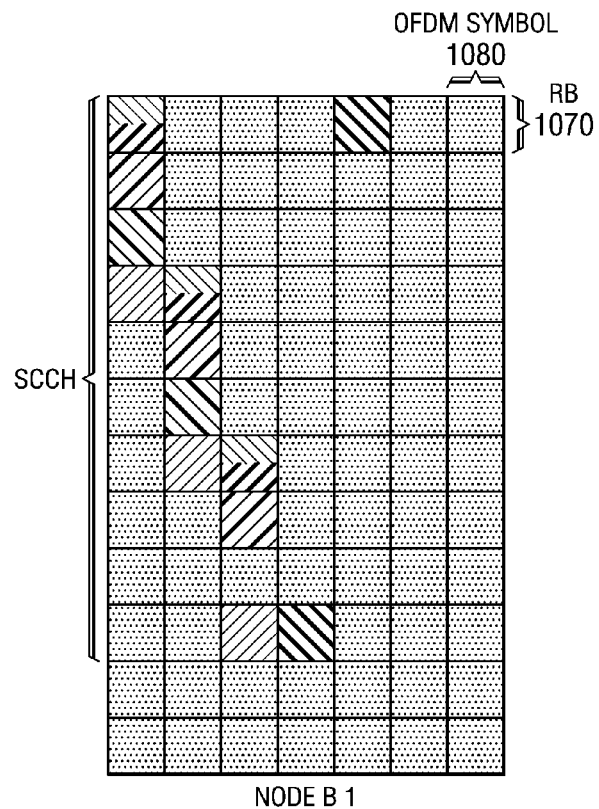
Figure 10:
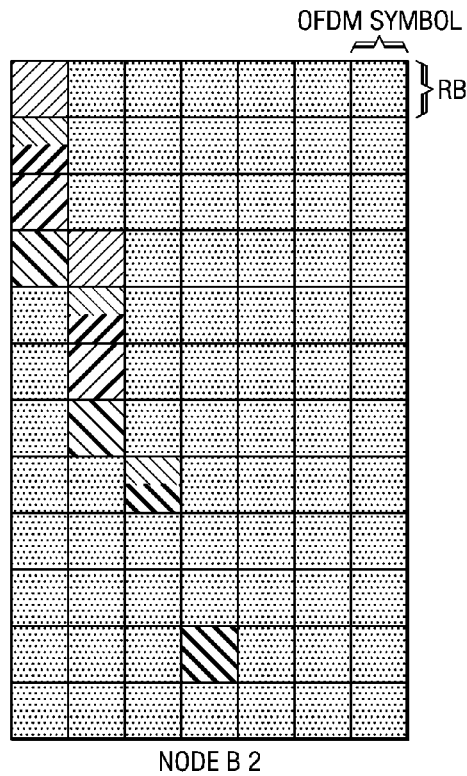
Figure 10:
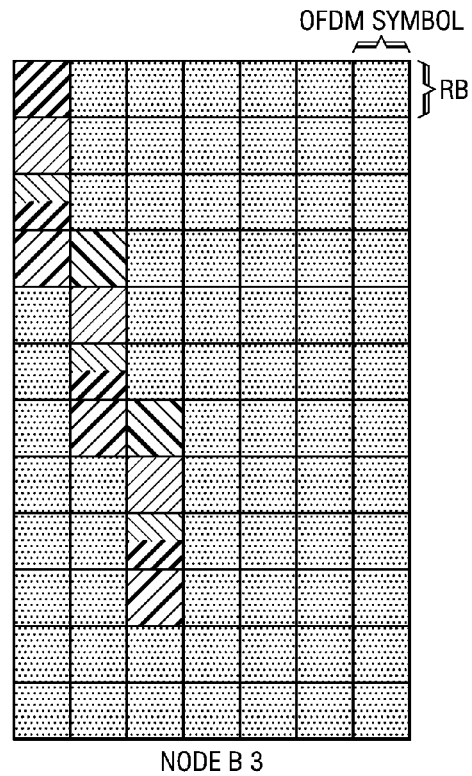

FIG. 9 and FIG. 10 show an exemplar structure for SCCH Cat0 and Cat1 (remaining SCCH) further illustrating the embodiments of the invention. Time Division Multiplexing (TDM) of the control and data channels is assumed in FIG. 9. Frequency Division Multiplexing (FDM) is assumed in FIG. 10. In the following, we refer to the TDM option but the same descriptions and arguments also apply for the FDM one.

Cat0 910 informs the UEs of the remaining SCCH size, thereby limiting tire waste of resources associated with having a fixed SCCH size which may not always be filled. The exemplary SCCH granularity in FIG. 9 is one RB 970 in one OFDM symbol 980 but it can generally be any number of sub-carriers including one sub-carrier or even one OFDM symbol. The control channel (scheduling assignment) corresponding to a scheduled UE is transmitted with a MCS determined by the SINR that will be experienced by the transmission to that UE. The serving Node B can determine this SINR either based on the DL CQI reported by each UE having a DL scheduling assignment or implicitly based on the UL CQI the serving Node B determines for each UE having an UL scheduling assignment. The larger the SINR, the higher the MCS in terms of spectral efficiency. As the exemplary embodiment considers that the control channel transmission from the serving Node B to each scheduled UE is distributed in frequency, the MCS region may be determined based on the average SINR and not the individual SINR in each RB. Three MCS regions 920, 930, and 940 are considered (as an example) in FIG. 9 (the same applies in FIG. 10) and the remaining RBs in the OFDM symbols of a TTI are allocated to data 950 and other channels such as reference signals (not shown). Reference signals may also occupy OFDM symbols where the control channel is transmitted. In general more than three MCS regions may be used as shown for example below in Table 1. Repetition coding of one MCS results into a different MCS (with spectral, efficiency that is inversely proportional to the repetition factor).

TABLE 1

| MCS 7 | 16QAM, R = $2/3$ |
|---|---|
| MCS 6 | 16QAM, R = $1/2$ |
| MCS 5 | 16QAM, R = $1/3$ |
| MCS 4 | QPSK, R = $1/2$ |
| MCS 3 | QPSK, R = $1/3$ |
| MCS 2 | QPSK, R = $1/4$ |

TABLE 1-continued

| MCS 1 | QPSK, R = 1/3, 2x repetition |
| MCS 0 | QPSK, R = 1/4, 2x repetition |

Figure 7:
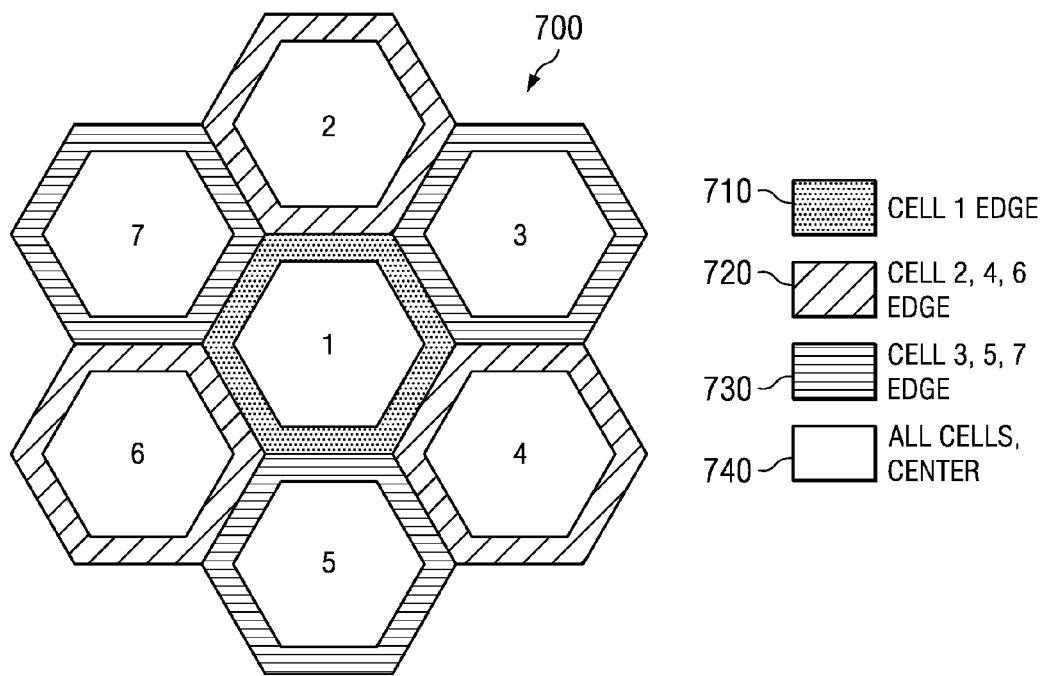
FIG. 7 shows an exemplary cell structure highlighting the cell edges where reserved resource blocks are used for transmission by each Node B through application of interference co-ordination through fractional frequency re-use.

The lowest MCS region 925 in terms of spectral efficiency (or additionally the next lower MCS region(s) 935 if possible in terms of available resources) may be associated with reserved RBs for use at the cell edge through the application of cell edge interference co-ordination through fractional frequency reuse (IC-FFR), embodiments of which are described in co-pending U.S. application Ser. No. 11/535,867. With IC-FFR, certain RBs in a reference Node B are reserved to be protected by interference from interfering (adjacent) Node Bs by imposing the restriction that the interfering Node Bs do not transmit with full power in the RBs reserved by the referenced Node B (FIG. 7). In the example of FIG. 7, cell 1 is allocated one-third of that spectrum 710, cells 2, 4, and 6 are allocated a second one-third 720, and cells 3, 5, and 7 are allocated the final one-third 730. When the Node B scheduler of any of the previous cells schedules a set of UEs for transmission, it may assign the one-third of these scheduled UEs it determines to be located closer to the cell edge (than the remaining two-thirds of UEs) in the one-third of reserved RBs this reference Node B has been allocated. The remaining two-thirds of scheduled UEs, deemed to be located closer to the cell interior, are scheduled in the remaining two-thirds of the available spectrum. With IC-FFR, the low SINR values of the geometry CDF are improved and no repetition coding is necessary, thereby improving spectral efficiency and avoiding unnecessary increase of the SCCH size and the corresponding overhead.

The control channel codeword carrying the scheduling assignment information for each DL or UL scheduled UE is transmitted with an MCS corresponding to the SINR conditions of the referenced UE as determined by the serving Node B. As the SINR conditions experienced by UEs in the serving area of a Node B may have significant variations, multiple MCS regions are used to capture the SINR conditions. The MCS regions are predetermined.

The Cat0 field is transmitted by the serving Node B and is designed so that it is received by potentially all UEs with a desired reliability. Cat0 informs of the number of DL and UL scheduled UEs in each MCS region and consequently, it informs the size of each MCS region for the SCCH transmission. Cat0 is transmitted by the serving Node B with a predetermined MCS and a predetermined size and both are known in advance by all UEs. The MCS regions are predetermined.

The main embodiment of this invention, that is further described in the remaining of this application, can be outlined as follows: Cat0 can be used by each DL scheduled UE to determine the UL resources for ACK/NAK transmission related to the DL data packet Cat0 may also be used by each DL scheduled UE to determine the UL resources for transmission of CQI feedback for DL scheduling.

Additional attributes of the SCCH transmission (including Cat0) are outlined as follows:
a) Frequency hopping (FIT) is applied to RBs (or sub-carriers) carrying Cat0 or the same control channel codeword to provide frequency diversity.
b) Based on the reported CQI, the scheduler first determines the number of UEs whose SCCH transmission (not including Cat0) can achieve the desired codeword error rate target (e.g. 1%) with, the highest MCS. Subsequently, die second highest MCS is considered, and so on until the SCCH of all UEs selected for scheduling is mapped onto a certain. MCS.
c) The size of each MCS region may vary between consecutive TTIs depending on the number of UEs whose Cat1 (remaining SCCH) is transmitted in each MCS region. Only the number of these UEs for each MCS region needs to be signaled in Cat0 and the UEs can then know the size of each MCS and consequently the size of the control channel.

The estimate of the SINR that will be experienced by each transmission from the serving Node B to each DL or UL scheduled UE is utilized to code the control channel, information (scheduling assignments) in the appropriate MCS region in order to ensure reception with a target codeword error rate. In addition to the SINR, the appropriate MCS region depends on the transmitter antenna diversity, on the UE speed (as determined for example based on Doppler shift estimation at the serving Node B), and on the multi-path propagation conditions introduced by the channel medium to each transmitted control channel signal as they directly impact the achievable codeword error rate for a given SINR value. For DL scheduled UEs, the SINR is determined from the CQI feedback these UEs provide to the serving Node B in order for the latter to schedule the transmission of data packets (by determining the MCS and the RBs used for the data transmission to a corresponding scheduled UE). For UL scheduled UEs, the SINR may be determined at the serving Node B through the transmission of a reference signal by each UL scheduled UE over the entire UL scheduling bandwidth for that UE.

Although the DL communication channel used for the control signaling (scheduling assignments) transmission and the UL communication channel used to obtain an SINR estimate for UL scheduled UEs may have different fading characteristics, the additional diversity provided by the possible multiple transmitter and receiver antennas and the frequency hopped transmission of the control channel introducing frequency diversity can effectively mitigate the impact of variations in the fading characteristics between the two communication channels. Moreover, as the multi-path propagation characteristics experienced by a given UE are typically the same in the DL and UL of a communication system, the Node B may use this information to provide additional protection to UEs experiencing low multi-path diversity by placing the corresponding control signaling information in a lower MCS region than indicated by the UL SINR measurement, thereby providing some performance margin.

The embodiment of the invention relates to the use of Cat0 by UEs to determine the position (and size) of UL resources required for ACK/NAK and possibly CQI transmission. Cat0 allows each DL scheduled UE during a given TTI to know of the MCS region of the control channel scheduling assignments transmission to every DL scheduled UE during the same TTI. Because of the assumed distributed (frequency hopped) transmission of the control channel, the MCS region is directly related to the UE SINR over the entire scheduling bandwidth. As previously mentioned, even though the lading characteristics of the DL and UL channels may not be the same, employing a distributed transmission in the UL and further relying on additional diversity, such as the one provided by multiple receiver or transmitter antennas, can associate the DL MCS used for the control signaling for scheduling to the UL resources required for ACK/NAK transmission corresponding to the DL date packets. Even through each UE could individually determine the required number of such resources from its DL CQI and path loss measurement the exact position of these UL time-frequency resources depends on the corresponding ones for other UEs.

One obvious method to address this issue is explicit DL signaling, similar to UL scheduling assignments for UE data transmission, which increases the SCCH overhead, thereby reducing the achievable throughput. With the method described in this invention, each UE implicitly determines the position of the UE time-frequency resources for ACK/NAK transmission by exploiting the Cat0 information. Then, each DL scheduled UE can know the UL resources required for ACK/NAK transmission for every other scheduled UE during the referenced TTI and the Node B can know where to expect the ACK/NAK transmission from every scheduled UE. In the exemplary embodiment the UL resource granularity is one RB, or one cyclic shift of a CAZAC sequence transmitted in one or more RBs, and lower numbered MCS indicate lower SINR. Then, if Cat0 indicates SCCH transmission of two DL UEs in MCS region 1 (UE1, UE2), three DL UEs in MCS region 2 (UE3, UE4, and UE5), and one UE in MCS region 3 (UE6), the ACK/NAK transmission can be as follows. UE1 may transmit in RB1, RB7, and RB12, UE2 may transmit in RB2, RB8, and RB13, UE3 may transmit in RB3 and RB9, UE4 may transmit in RB4 and RB10, UE5 may transmit in RB5 and RB11, and UE6 may transmit in RB6. This ACK/NAK transmission partitioning is summarized below in Table 2.

TABLE 2

| UE1 | UE2 | UE3 | UE4 | UE5 | UE6 | UE1 | UE2 | UE3 | UE4 | UE5 | UE1 | UE2 |
|---|---|---|---|---|---|---|---|---|---|---|---|---|
| RB1 | RB2 | RB3 | RB4 | RB5 | RB6 | RB7 | RB8 | RB9 | RB10 | RB11 | RB12 | RB13 |

In general, for P MCS regions 1, 2, . . . . P for the transmission of DL scheduling assignments, $M_1, M_2, \ldots, M_P$ UEs in each corresponding MCS region during a reference TTI, and $N_1, N_2, \ldots, N_P$ UL RBs required for the ACK/NAK transmission for each UE in the corresponding MCS region, the UL RB mapping for the ACK/NAK transmission can be as follows. The $M_1$ UEs transmit in the first $M_1$ RBs, the $M_2$ UEs transmit in the next $M_2$ RBs, and so on until the $M_P$ UEs transmit in $M_P$ RBs. This process continues for a total of $N_P$ times required for the $M_P$ UEs to fulfill, their UL RBs requirements for ACK/NAK transmission. Then, the process again continues, without including these $M_P$ UEs, for a total of $N_{P-1}-N_P$ times additionally required for the $M_{P-1}$ UEs to fulfill their corresponding ACK/NAK transmission requirements. The process completes when the $M_1$ UEs fulfill their UL RBs requirement for ACK/NAK transmission.

The ACK/NAK and CQI transmission in the UL may typically be allocated, a fixed amount of dedicated resources (certain number of frequency RBs throughout the UL TTI). The remaining resources after the ACK/NAK transmission may be allocated to CQI transmission. If CQI transmission is associated with DL scheduling, the resource allocation can follow the same principles as that for ACK/NAK transmission.

However, a UE may not have to transmit CQI feedback every time it is scheduled as the DL channel may not have materially changed between two consecutive DL scheduling instances. Instead, a time period $T_1$ may be enforced where a UE does not transmit CQI feedback if the time period $T_1$ has not been fulfilled since the last CQI transmission instance. Then, the remaining resources allocated to CQI transmission can be allocated to UEs that did not have a CQI transmission over a time period $T_2$. Such UEs that need to transmit a CQI may use the available resources using contention based access as it is known in the art. To enable this, Cat0 should not be power controlled, should be transmitted with enough reliability (low MCS and/or high, power) to be received, by all UEs in the serving Node B area, and should be CRC protected. The UEs, knowing the time period $T_1$ and the time period $T_2$, may determine the available resources by decoding Cat0 over a multiple of TTIs.

The above method also applies to UEs that do not have DL scheduling assignments extending to the transmission of a distributed reference signal, in the UL in order for the serving Node B to determine the UL CQI.

When broadcast/multicast TTIs are TDM with unicast. TTIs in the DL, the UL resources for CQI and ACK/NAK transmission after a predetermined time period can be used exclusively for CQI transmission as there are no unicast packets transmitted in the DL during a previous broadcast/multicast TTI for which an ACK/NAK transmission is needed in the UL. Broadcast/multicast refers to the communication mode from one or more Node Bs to one or more UEs where the transmitted signal carries the same data which is typically destined to multiple UEs. Unicast refers to dedicated communication mode with a single UE with data, that is not destined to any other UE.

It should be noted that neither the ACK/NAK transmission nor the CQI one need to confined over one UL TTI and may span several ones particularly for UEs in poor SINR conditions. Moreover, the RBs used for ACK/NAK transmission are preferably not adjacent in frequency in order to provide frequency diversity. In case that only one RB is required for ACK/NAK transmission, multiple RBs may be used by the UE simultaneously lowering its transmission power in each of the multiple RBs by a proportional amount. At least two of these multiple RBs should occupy substantially different portions of the available frequency spectrum.

Although the preferred embodiment considers that Cat0 explicitly indicates the number of DL scheduling assignments in each of the predetermined MCS regions, Cat0 may alternatively indicate the size of the control channel is each of the previous MCS regions with granularity of more than one DL scheduling assignments. For example, a certain, size of the control channel may accommodate M, M+1, . . . , M+n DL scheduling assignments with n greater than zero. The same principles may again apply in order for each UE having a DL scheduling assignment to determine the location of UL resources for the transmission of ACK/NAK and possibly CQI signaling. For example, if the number of DL scheduling assignments specified by the control channel size in an MCS region is smaller that the maximum possible, some of the UEs may use the additional resources to provide additional margin to their ACK/NAK or CQI transmission according to a predetermined rule or the additional resources may remain unused for a reduction in UL interference. No modification is needed if the number of DL scheduling assignments specified by the control channel size in an MCS region is the maximum possible for that control channel size.

Figure 11:
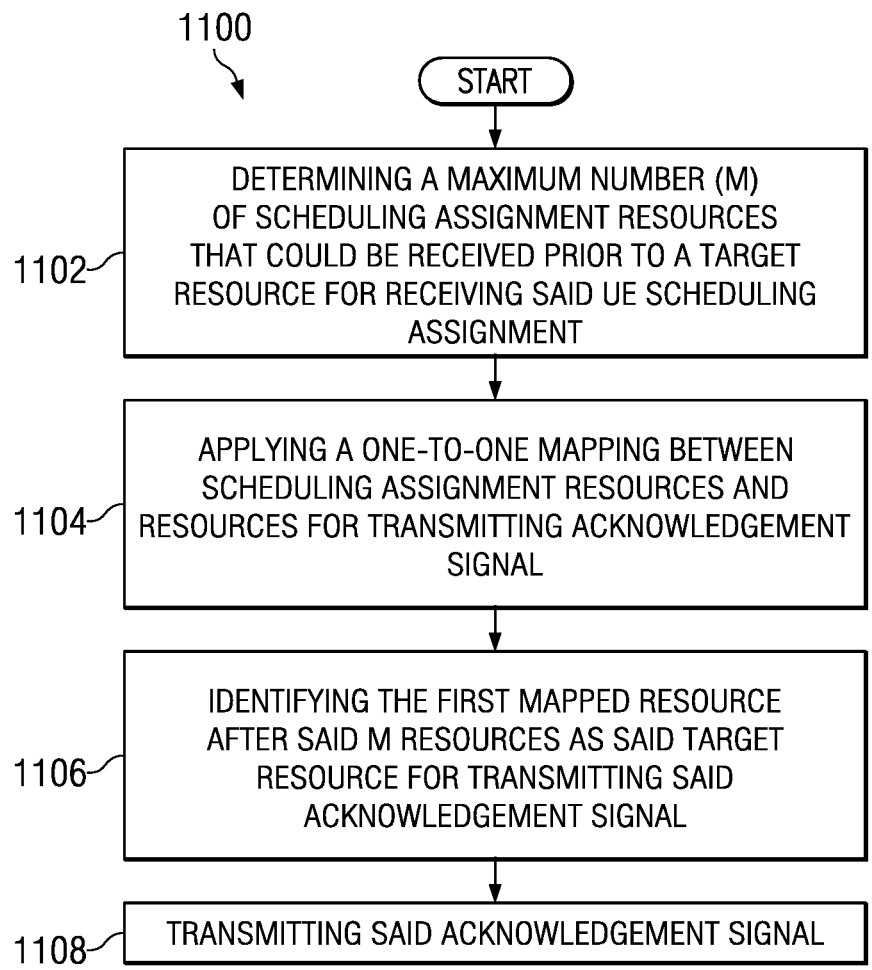
FIG. 11 is a flow chart illustrating a method associated with an example embodiment.

FIG. 11 is a flow chart of a method 1100, according to one embodiment, for a User Equipment (UE) to determine a resource for transmitting an acknowledgment signal to a Node B, the acknowledgement signal being generated in response to receiving by said UE a scheduling assignment transmitted by said Node B, the method commences at block 1102 with determining a maximum number (M) of scheduling assignment resources that could be received prior to a target resource for a receiving the UE scheduling assignment. The method 1100 proceeds at block 1104 with applying a one-to-one mapping between scheduling assignment resources and resources for transmitting acknowledgement signal. The method includes identifying the first mapped resource after said M resources as said target resource for transmitting said acknowledgement signal at block 1106. The method further includes transmitting the acknowledgement signal at block 1108.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled In the art and could be made without departing from the spirit and scope disclosed herein.

What is claimed is:

1. A method for a User Equipment (UE) to determine a resource for transmitting an acknowledgement signal to a Node B, said acknowledgement signal being generated in response to receiving by said UE a scheduling assignment transmitted by said Node B, the method comprising the steps of:
   receiving a control channel from the Node B using a modulation and coding scheme (MCS) determined from CQI feedback for said UE, wherein the Node B communicates a number of downlink (DL) and uplink (UL) scheduling assignments in each MCS region, of a set of MCS regions, through a field that is separately transmitted prior to a remaining part of the control channel carrying the DL and UL scheduling assignments;
   determining a maximum number (M) of scheduling assignment resources that could be received prior to a target resource for receiving said UE scheduling assignment;
   applying a one-to-one mapping between scheduling assignment resources and resources for transmitting acknowledgement signal;
   identifying the first mapped resource after said M resources as said target resource for transmitting said acknowledgement signal; and
   transmitting said acknowledgement signal.

2. The method of claim 1, wherein the field has a fixed and predetermined size and MCS.

3. The method of claim 2, wherein the field is received by all scheduled UEs and all UEs communicating with the serving Node B regardless if they receive a scheduling assignment during the reference TTI.

4. A method for a User Equipment (UE) to determine a resource for transmitting an acknowledgement signal to a Node B, said acknowledgement signal being generated in response to receiving by said UE a scheduling assignment transmitted by said Node B, the method comprising the steps of:
   receiving a control channel from the Node B using a modulation and coding scheme (MCS) determined from CQI feedback for said UE, wherein each downlink (DL) scheduled UE is enabled to utilize knowledge of MCS regions used for control channel transmission to ALL DL scheduled UEs during a corresponding TTI in order to transmit the associated control information in the uplink (UL);
   determining a maximum number (M) of scheduling assignment resources that could be received prior to a target resource for receiving said UE scheduling assignment;
   applying a one-to-one mapping between scheduling assignment resources and resources for transmitting acknowledgement signal;
   identifying the first mapped resource after said M resources as said target resource for transmitting said acknowledgement signal; and
   transmitting said acknowledgement signal.

5. The method of claim 4, wherein the acknowledgement signal is ACK/MK regarding the DL data packet reception.

6. The method of claim 4, wherein the acknowledgement signal is CQI feedback.

7. The method of claim 4, wherein a number and position of UL time-frequency resources assigned to a transmission of such UL control information is determinable without explicit DL control signaling and corresponding overhead.

8. A method for a User Equipment (UE) to determine a resource for transmitting an acknowledgement signal to a Node B, said acknowledgement signal being generated in response to receiving by said UE a scheduling assignment transmitted by said Node B, the method comprising the steps of;
   receiving a control channel from the Node B using a modulation and coding scheme (MCS) determined from CQI feedback for said UE, wherein the Node B communicates a number of downlink (DL) and uplink (UL) scheduling assignments in each MCS region, of a set of MCS regions, through a field that is separately transmitted prior to a remaining part of the control channel carrying the DL and UL scheduling assignments;
   determining a maximum number (M) of scheduling assignment resources that could be received prior to a target resource for receiving said UE scheduling assignment;
   identifying the first resource after said scheduling assignment resources as said target resource for transmitting said acknowledgement signal; and
   transmitting said acknowledgement signal.

9. The method of claim 8, wherein the field has a fixed and predetermined size and MCS.

10. The method of claim 9, wherein the field is received by all scheduled UEs and all UEs communicating with the serving Node B regardless if they receive a scheduling assignment during the reference TTI.

11. A method for a User Equipment (UE) to determine a resource for transmitting an acknowledgement signal to a Node B, said acknowledgement signal being generated in response to receiving by said UE a scheduling assignment transmitted by said Node B, the method comprising the steps of:
- receiving a control channel from the Node B using a modulation and coding scheme (MCS) determined from CQI feedback for said UE, wherein each downlink (DL) scheduled UE is enabled to utilize knowledge of MCS regions used for control channel transmission to ALL DL scheduled UEs during a corresponding TTI in order to transmit the associated control information in the uplink (UL);
- determining a maximum number (M) of scheduling assignment resources that could be received prior to a target resource for receiving said UE scheduling assignment;
- identifying the first resource after said scheduling assignment resources as said target resource for transmitting said acknowledgement signal; and
- transmitting said acknowledgement signal.

12. The method of claim 11, wherein the acknowledgement signal is ACK/NM (regarding the DL data packet reception.

13. The method of claim 11, wherein acknowledgement signal is CQI feedback.

14. The method of claim 11, wherein a number and position of UL time-frequency resources assigned to a transmission of such UL control information is determinable without explicit DL control signaling and corresponding overhead.

* * * * *